United States Patent [19]
Kohno et al.

[11] Patent Number: 5,359,379
[45] Date of Patent: Oct. 25, 1994

[54] CAMERA SYSTEM

[75] Inventors: Takahiro Kohno; Hitoshi Narita, both of Kanagawa, Japan

[73] Assignee: Canon Kabushiki Kaisha, Tokyo, Japan

[21] Appl. No.: 56,616

[22] Filed: May 4, 1993

Related U.S. Application Data

[60] Continuation of Ser. No. 813,821, Dec. 27, 1991, abandoned, which is a division of Ser. No. 419,742, Oct. 11, 1989, Pat. No. 5,079,578.

[30] Foreign Application Priority Data

Oct. 13, 1988 [JP] Japan .................. 63-259198
Dec. 19, 1988 [JP] Japan .................. 63-319945

[51] Int. Cl.⁵ .................. G03B 17/00; G03B 7/26
[52] U.S. Cl. .................. 354/286; 354/484
[58] Field of Search .................. 354/286, 474, 288

[56] References Cited

U.S. PATENT DOCUMENTS

| | | | |
|---|---|---|---|
| 4,739,356 | 4/1988 | Ogura et al. | 354/286 |
| 4,782,355 | 11/1988 | Sakai et al. | 354/400 |
| 4,790,649 | 12/1988 | Harada et al. | 354/400 |
| 4,853,725 | 8/1989 | Matsuda et al. | 354/286 |
| 4,924,249 | 5/1990 | Aihara et al. | 354/286 |
| 4,970,558 | 11/1990 | Matsuda et al. | 354/286 |
| 4,999,659 | 3/1991 | Fukuhori et al. | 354/286 |
| 5,021,812 | 6/1991 | Kohno et al. | 354/286 X |
| 5,043,754 | 8/1991 | Aihara et al. | 354/286 |
| 5,079,578 | 1/1992 | Kohno et al. | 354/286 |

Primary Examiner—Michael L. Gellner
Assistant Examiner—Jae N. Noh
Attorney, Agent, or Firm—Fitzpatrick, Cella, Harper & Scinto

[57] ABSTRACT

In a camera system comprising a camera body and an optical accessory which can be detachably coupled with each other through their mounts by rotating around an optical axis, mutually corresponding groups of electric connection terminals including power-supply and power-supply receiving terminals are aligned around the optical axis on the camera body and the optical accessory and arranged to come into contact with each other when the two mounts are coupled, a protruding part is formed close to the connection terminals of the camera body to protrude further than them in their contacting direction; and a cutout part is formed close to the electric connection terminals of the optical accessory in their contacting direction in a position corresponding to the protruding part of the camera body when the two mounts are coupled with each other.

31 Claims, 9 Drawing Sheets

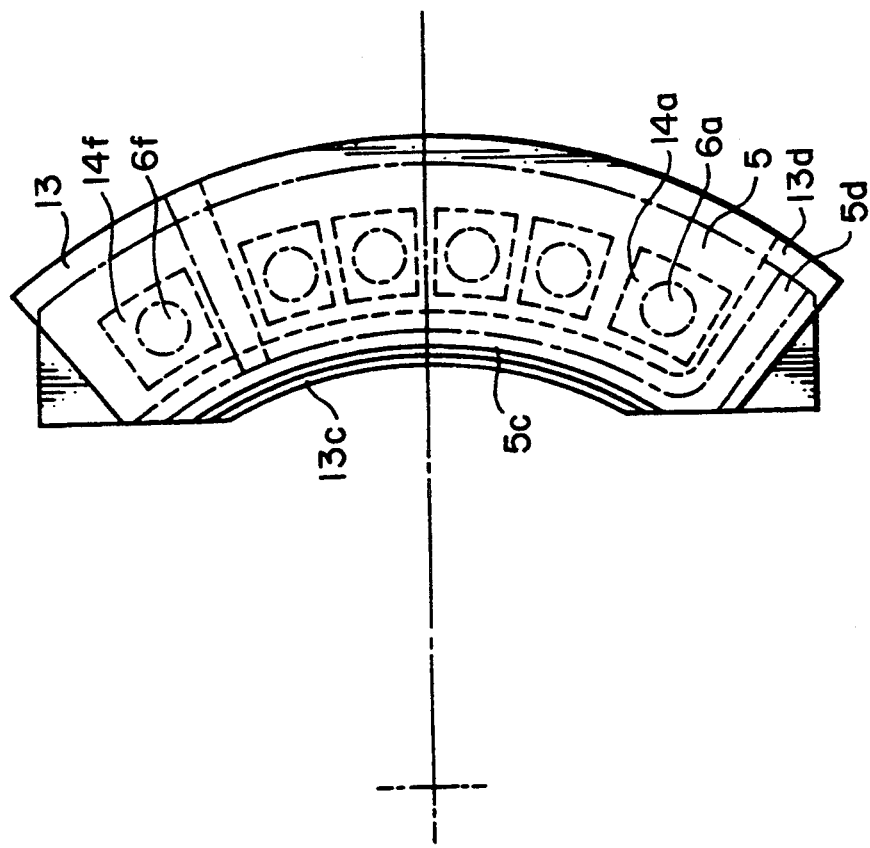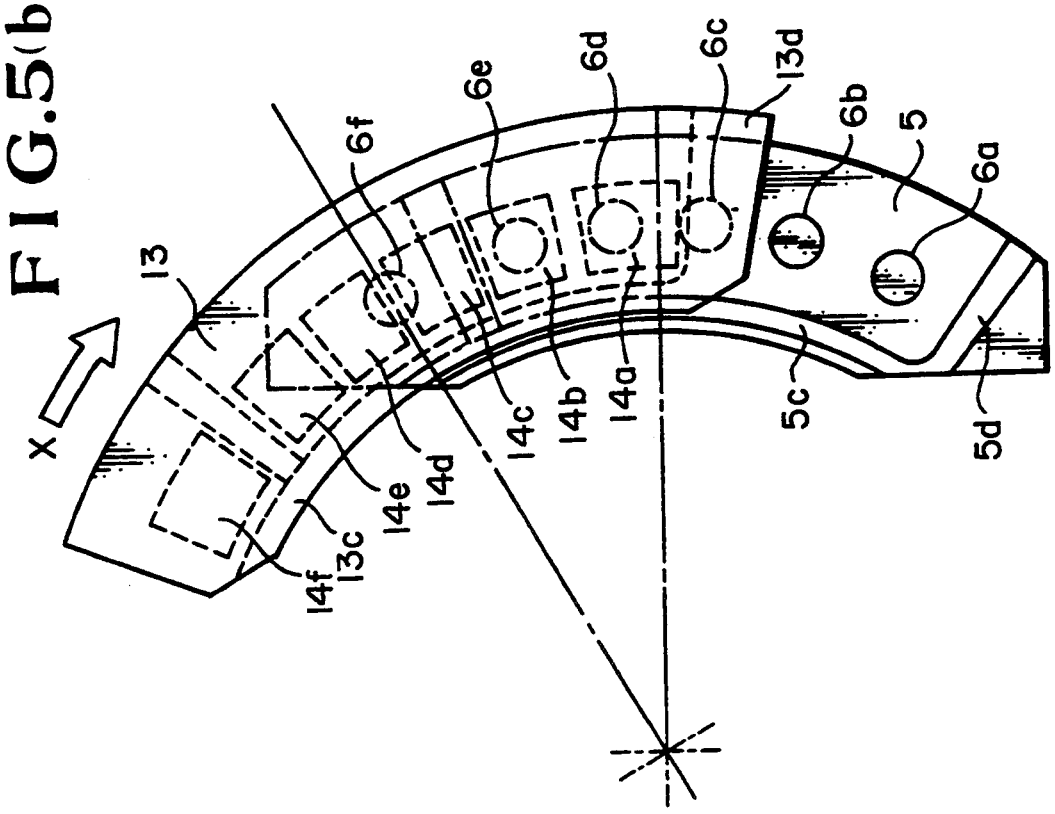

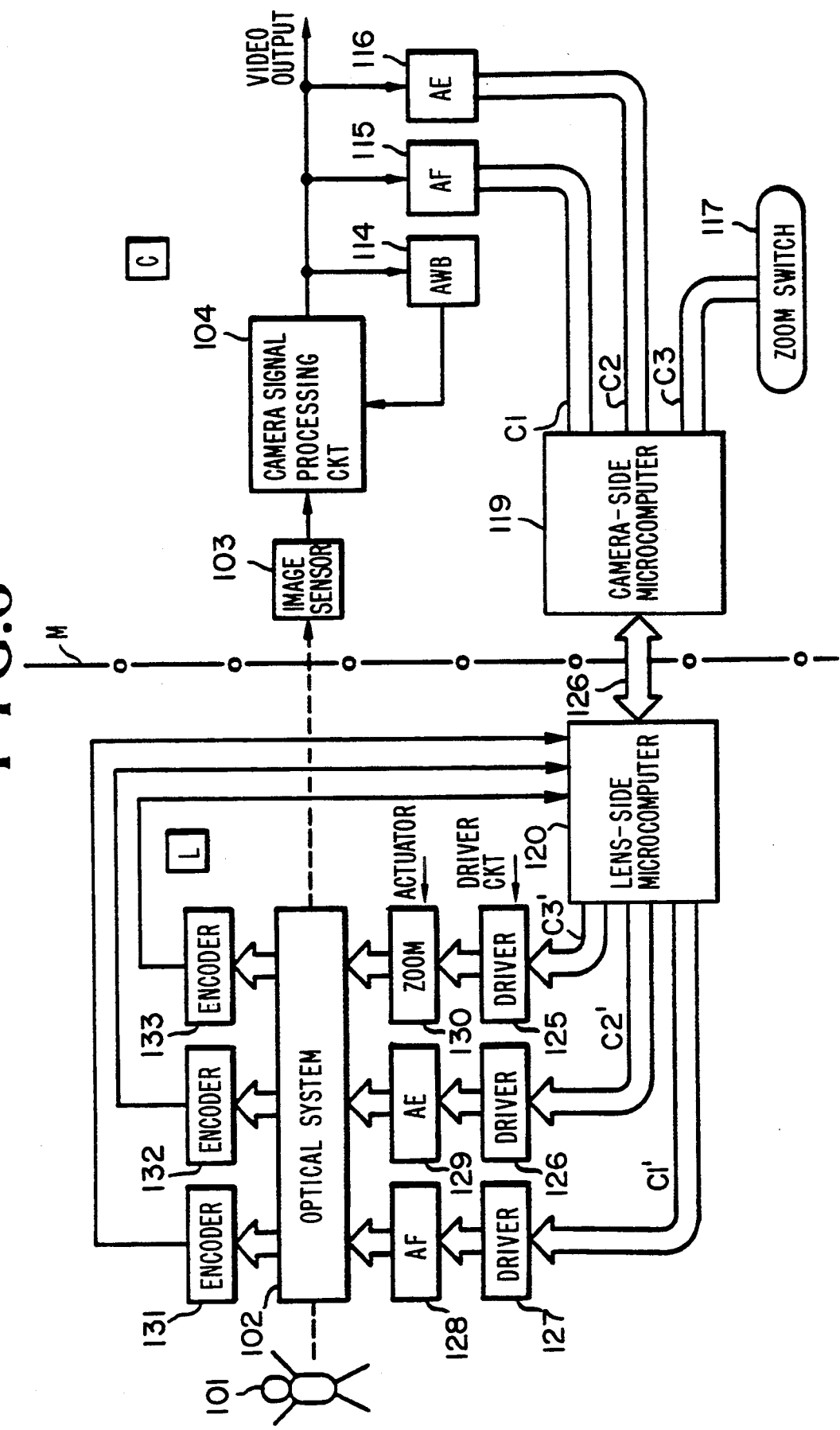

CAMERA SYSTEM

This application is a continuation of application Ser. No. 07/813,821 filed Dec. 27, 1991, now abandoned which is a divisional of application Ser. No. 07/419,742 filed Oct. 11, 1989, now U.S. Pat. No. 5,079,578.

BACKGROUND OF THE INVENTION

1. Field of the Invention

This invention relates to a camera body, an optical accessory or a camera system.

2. Description of the Related Art

Camera systems of the kind having optical accessories such as an interchangeable lens, an intermediate tube, various converters, etc. detachably mounted on a camera body by a bayonet mount device have been known.

The application of electronics to camera systems has advanced during recent years. As a result, communication and power supply arrangement have become necessary between the camera body and the optical accessory. To meet this requirement, camera systems of varied kinds have been proposed. They have electric connection terminals such as contact pins or the like arranged on both the optical accessory and the camera body. The arrangement is such that: The terminals arranged on both sides come into contact with each other when the optical accessory is mounted on the camera body by rotating the mounts of both sides relative to each other. With the optical accessory thus mounted, the camera body supplies electric energy to the optical accessory and reads the content of a ROM included in the optical accessory or controls actuators disposed within the optical accessory. These camera systems have been disclosed among others in U.S. Pat. Nos. 4,790,649, 4,782,355, 4,853,725; No. 4,924,249 and No. 4,999,659 and Ser. No. 913,343 filed on Sep. 30, 1986.

Generally, the power source such as a battery or the like of the camera system is loaded on the camera body and the electric energy is supplied from the camera body to the optical accessory. Therefore, the camera body is provided with power supply terminals including, at least, a power supply level terminal and a ground level terminal.

The power supply terminals of the camera body are hidden and untouchable when the optical accessory is mounted on the camera body. They are, however, exposed to the outside when the optical accessory is not mounted on the camera body. Under that condition, if a metal piece such as a coin or the like is inadvertently brought near to or dropped on the exposed terminals, the metal piece might come into contact with both the power supply level terminal and the ground level terminal. Then, circuits disposed on the side of the camera body might be broken by short-circuit.

To solve this problem, an improvement has been disclosed in U.S. patent application Ser. No. 012,862 filed on Feb. 10, 1987. In accordance with this improvement, a switch is arranged on the camera body to effect a power supply to the power supply connection terminal only when the optical accessory is completely mounted on the camera body. This method ensures safety but presents a problem in terms of increased cost increase.

U.S. patent application Ser. No. 221,614 filed on Jul. 20, 1988 has disclosed a method of providing a protruding part near to the electric connection terminals of the optical accessory for the purpose of preventing undesirable things such as dust, etc. from readily coming into contact with the terminals when the accessory is laid down directly on a desk or the like. However, in accordance with that method, the power supply connection terminal on the side of the camera body still remains unprotected from the hazard of short-circuiting.

SUMMARY OF THE INVENTION

It is an object of this invention to provide a camera body having a protruding part arranged near to a group of electric connection terminals of the camera body to protrude in the contacting direction of them in such a way as to guard power supply terminals included in the group.

It is another object of the invention to provide an optical accessory having a cutout groove formed near a group of electric connection terminals of the optical accessory in a shape corresponding to the above-stated protruding part of the camera body.

BRIEF DESCRIPTION OF THE DRAWINGS

FIGS. 5(a), 5(b) and 5(c) are enlarged sectional views taken on line 5—5 of FIG. 1 showing essential parts of mount parts as in the various stages of a rotatory mounting process. FIG. 6 is a block diagram showing the circuit arrangement of a camera system arranged as an embodiment of this invention.

DETAILED DESCRIPTION OF THE PREFERRED EMBODIMENTS

Figure 1:
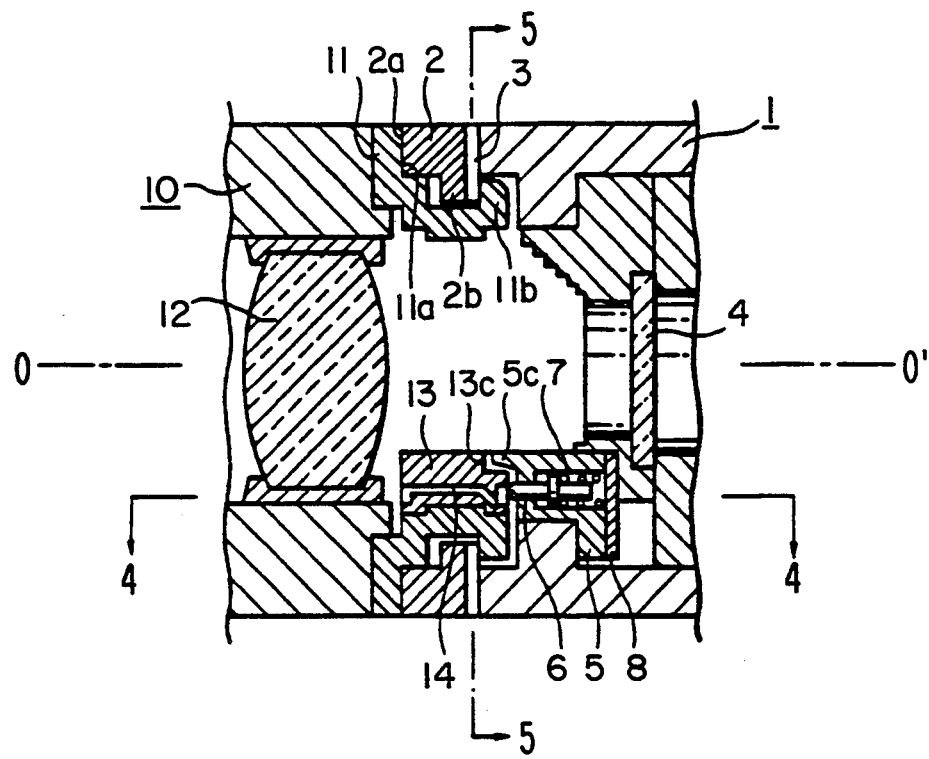
FIG. 1 is a sectional view of an embodiment of this invention showing a camera body and an interchangeable lens as in a state of having the latter mounted on the former.

FIGS. 1 to 5(c) show a video camera system to which this invention is applied. The illustrations include a video camera body 1; a camera mount 2 which is of a rotatory bayonet mounting type and is fixedly secured to the video camera body 1, the mount 2 being provided with a mount colliding face 2a which serves as a datum in the optical axis direction and three mount claws 2b; a leaf spring 3 which is arranged to abut on the mount claws of a lens mount and to bring the camera mount 2 and the lens mount into tight contact with each other; an optical filter 4; and a camera-side contact holder 5; and camera-side contacts 6 which serve as electric connection terminals and are carried by the camera-side contact holder 5 in such a way as to be movable in the optical axis direction O—O', the contacts 6 including a total of six contacts 6a to 6f. Conductive springs 7 are made of a conductive material including a total of six springs 7a to 7f, which are arranged to elastically urge the camera-side contacts 6a to 6f in the contacting direction. A printed circuit board 8 is electrically connected via the springs 7a to 7f to the camera-side contacts 6a to 6f. The board 8 has patterns formed thereon in positions corresponding to the camera-side contacts 6a to 6f (and the springs 7a to 7f). A lock pin 9 is arranged to be retractable from its position protruding from the mount colliding face 2a and to permit locking and unlocking, by means of an operation member which is not shown, in mounting and dismounting an interchangeable lens 10. The lens 10 is employed as an optical accessory. A bayonet mount type lens mount 11 is secured to the interchangeable lens 10 and is arranged to permit the lens 10 to be mounted on the camera body 1 by rotating it. The lens mount 11 is provided with a mount colliding face 11a which serves as a datum in the optical axis direction and three mount claws 11b. The illustrations further include an image forming lens 12; a lens-side contact holder 13; and lens-side contacts 14 including a total of six contacts 14a to 14f which are secured to (inserted in) the lens-side contact holder 13 as electric connection terminals and come into contact with the camera-side contacts 6a to 6f when the two mounts 2 and 11 are coupled by rotating them relative to each other. A lock slot 15 is arranged to allow the lock pin 9 to come into it for locking when the two mounts 2 and 11 are coupled. Further, the center point of the camera-side contacts 6a to 6f is located about 90 degrees away from the lock pin 9 round the optical axis. Meanwhile, the center point of the lens-side contacts 14a to 14f is located to be about 90 degrees away from the lock slot 15 around the optical axis.

Figure 4A:
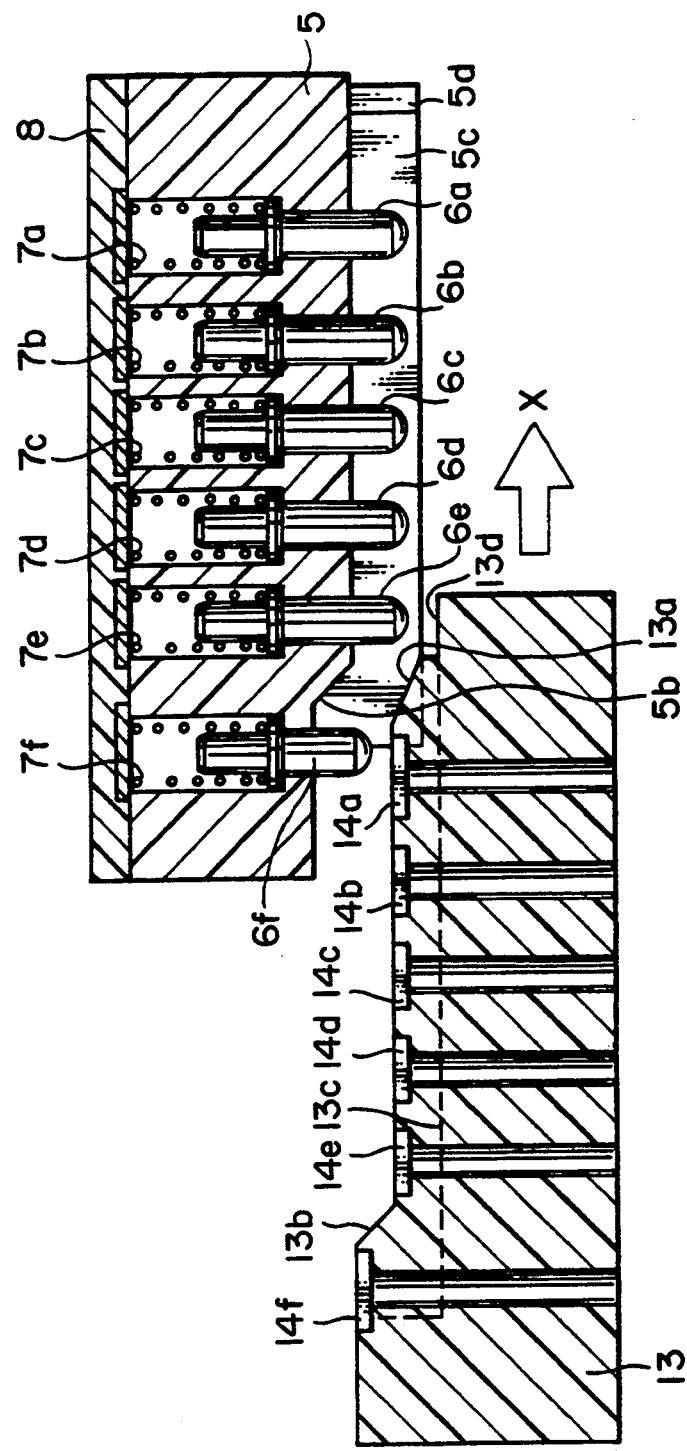
FIGS. 4(a), 4(b) and 4(c) are enlarged sectional views taken on line 4—4 of FIG. 1 showing the rotatory mounting movement of the mount parts.
Figure 4B:
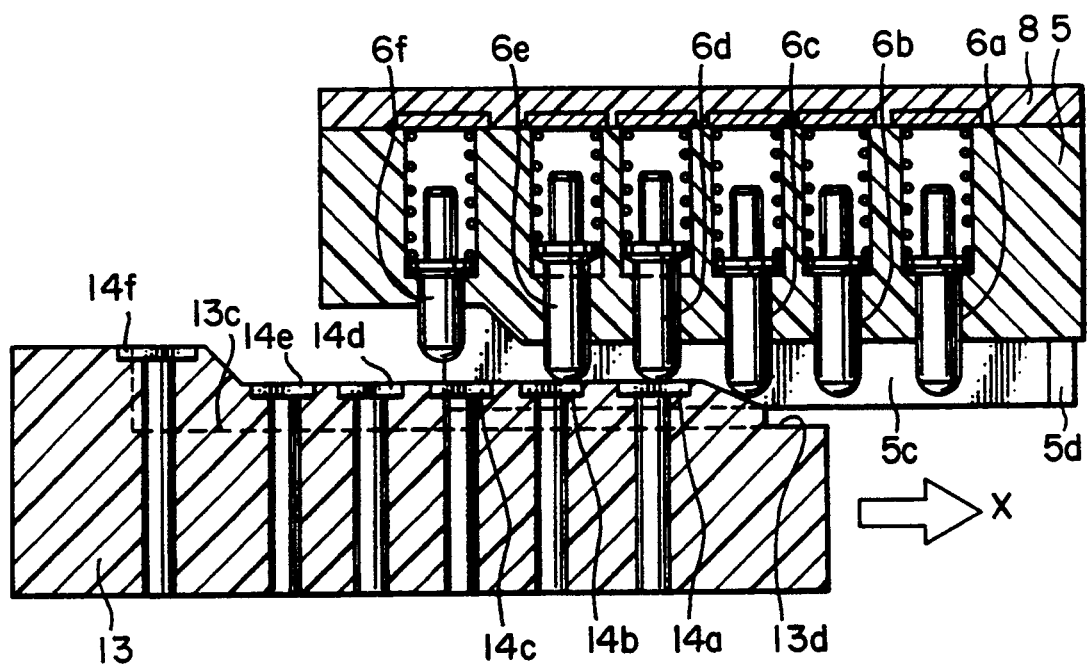
Figure 4C:
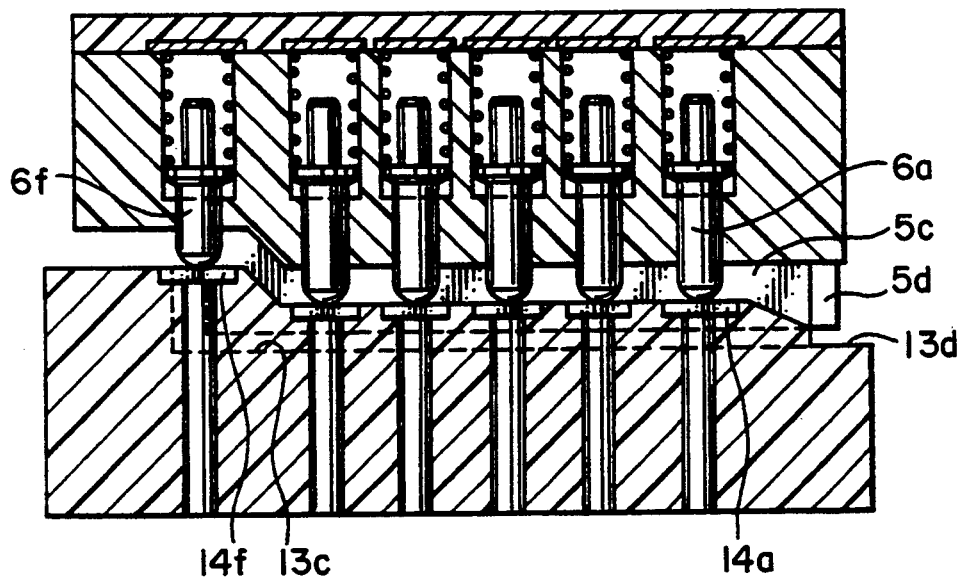
Figure 5A:
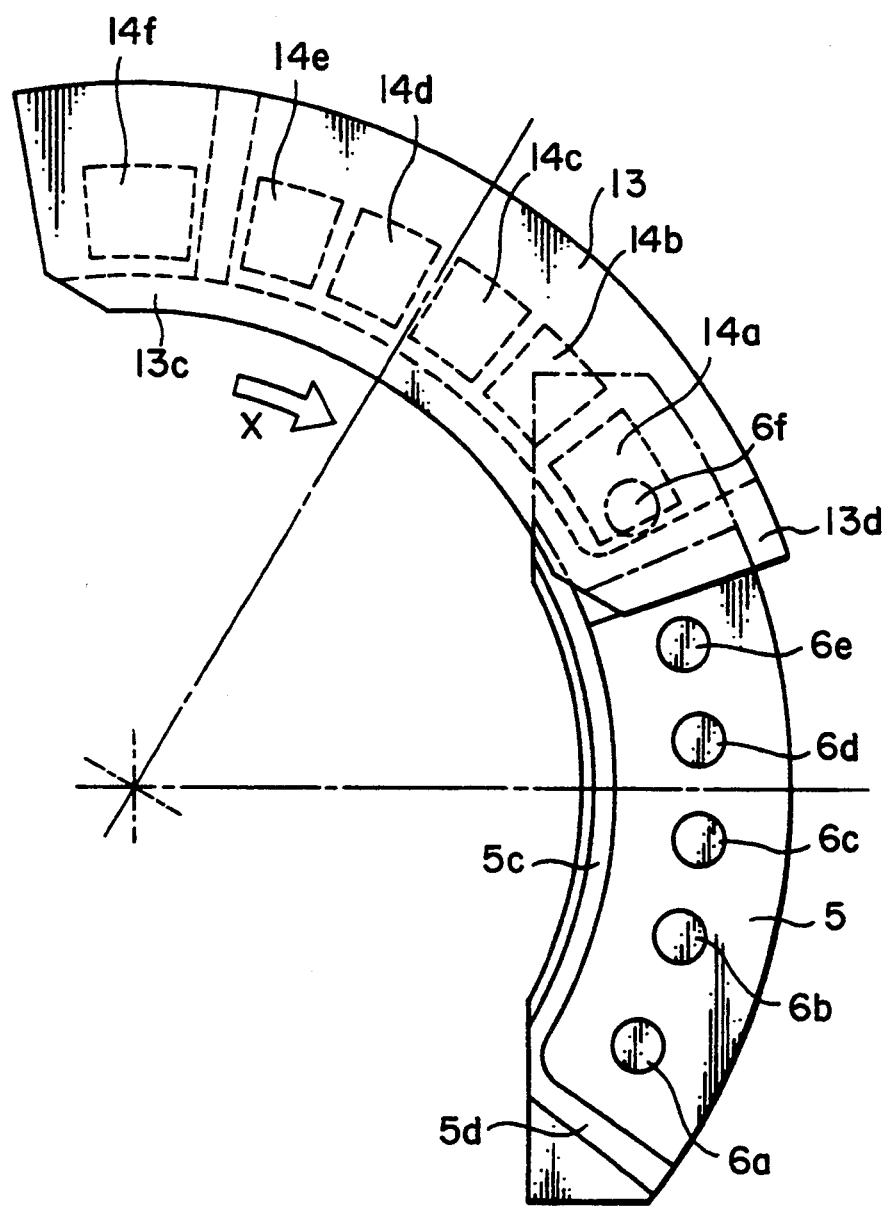

Referring to FIGS. 4(a), 4(b) and 4(c) and FIGS. 5(a), 5(b) and 5(c), the features and the operation of the embodiment are as follows: In the case of the embodiment, the camera-side contacts 6a and 6f relate to the power supply. More specifically, the camera-side contact 6a is provided for grounding while the other contact 6f is for a high potential. Other camera-side contacts 6b to 6e are for communication with the lens side. They are provided with a clock signal line, a camera-to-lens transmission line and a lens-to-camera transmission line. The lens-side contacts 14a and 14f are provided for power supply, and the lens-side contacts 14b to 14e are for communication with the camera side. The camera-side contact 6f (one of the power supply contacts) is set back (toward the image sensor) alone from the other contacts 6a to 6e in the contacting direction (in the optical axis direction O—O' as shown in FIG. 1) to have a lower height than others. This state is as shown in FIGS. 4(a) and 5(a) which show these contacts before mounting. Further, the springs 7a and 7f which urge the power-supply related camera-side contacts 6a and 6f are arranged to have a larger urging force than that of the other springs 7b to 7e. This is for the purpose of reducing contact resistance by allowing these power supply contacts 6a and 6f to have a greater contact pressure on the lens-side power supply contacts 14a and 14f than the contact pressure of the other contacts 6b to 6e on the lens-side contacts 14b to 14e. Generally, in terms of design work, the maximum allowable contact resistance of power supply contacts provided for a motor or the like differs from that of contacts for communication (or for IC parts). For example, if the contact resistance allowable for the power supply contacts is less than 0.1 ohm, the contact resistance allowable for the communication contacts is less than 1 ohm.

FIGS. 4(b) and 5(b) show these contacts as in the process of mounting. As shown, the camera-side contact 6f is arranged to be shorter in height and to protrude forward to a less extent than the other lens-side contacts 6a to 6e in the optical axis direction. This ensures that, during the mounting process, the contact 6f never comes into contact with any of the lens-side contacts 14a to 14e which are not corresponding to the contact 6f. Meanwhile, the lens-side contact 14f which corresponds to the camera-side contact 6f is arranged to be higher (protruding further forward in the direction of the optical axis) than the other lens-side contacts 14a to 14e. The arrangement is such that the lens-side contact 14f comes into contact with the camera-side contact 6f at the last stage of the rotatory mounting process. Other camera-side contacts 6a to 6e come into contact with corresponding lens-side contacts 14a to 14e at the last stage of the rotatory mounting process, respectively. In other words, the contact 6a comes into contact with the contact 14a, the contact 6b with the contact 14b, the contact 6c with the contact 14c, the contact 6d with the contact 14d and the contact 6e with the contact 14e as shown in FIGS. 4(c) and 5(c).

The rotatory mounting process of the embodiment is as follows: Referring to FIGS. 4(a) and 5(a) which show the mounting process as in its initial stage. Under this condition, the camera-side contacts 6a to 6f are not in contact with any of the lens-side contacts 14a to 14f.

When the interchangeable lens 10 is rotated to move the lens-side contact holder 13 from the state of FIGS. 4(a) and 5(a) in the direction of arrow X to a position as shown in FIGS. 4(b) and 5(b), the camera-side contacts 6e and 6d ride on a slanting face 13a formed on the camera-side contact holder 13 and slide over the face of the contact holder 13 which is arranged to be at the same height as, that is, flush with the contacts 14a to 14e. FIGS. 4(b) and 5(b) show this intermediate state of the rotatory mounting process.

FIGS. 4(c) and 5(c) show the rotatory mounting process as in its completed state, which is obtained by rotating the interchangeable lens 10 to move the lens-side contact holder 13 further in the direction of arrow X. Under this condition, the lens-side contacts are all in contact with their corresponding camera-side contacts.

More specifically stated, the camera-side contact 6f is out of contact with (not sliding over) any of the lens-side contacts 14a to 14e when it comes to confront them during the intermediate stage of the mounting process. At the last stage of the mounting process, the contact 6f rides on a slanting face 13b of the lens-side contact holder 13 to come into contact with the lens-side contact 14f. The camera-side contact 6e rides on the slanting face 13a of the lens-side to come to slide over the lens-side contacts 14a to 14d before it comes into contact with the corresponding lens-side contact 14e. The camera-side contact 6d likewise rides on the slanting face 13a to slide over the lens-side contacts 14a to 14c until it comes into contact with the lens-side contact 14d. Following this, the camera-side contact 6c rides on the slanting face 13a to slide over the lens-side contacts 14a and 14b until it comes into contact with the lens-side contact 14c. The camera-side contact 6b also rides on the slanting face 13a to slide over the lens-side contact 14a before it comes into contact with the lens-side contact 14b. The camera-side contact 6a lastly rides on the slanting face 13a to come into contact with the lens-side contact 14a. An important feature of the embodiment lies in that the contacts 6a and 6f which have a greater contact pressure than the other camera-side contacts are arranged to come into sliding contact with the corresponding lens-side contacts only once respectively. This not only reduces the contact resistance of the power-supply related contacts but also eliminates the possibility of an adverse effect, such as wear, on the lens-side contacts 14b to 14e that otherwise would result from sliding contact with them under the greater contact pressure. Further, since the power-supply related camera-side contacts 6a and 6f never come into slide contact with the communication-related lens-side contacts 14b to 14e during the rotary mounting process, any circuit that is arranged inside the interchangeable lens 10 never be electrically broken by them. Besides, the invented contact arrangement reduces the wear of contacts by lessening the sliding contact frequency of the camera-side contacts 6a to 6f and the lens-side contacts 14a to 14f as a whole.

The features of this embodiment are as follows: The camera-side contact holder 5 is provided with protruding parts 5c and 5d. The protruding part 5c is located perpendicularly away from the camera-side contacts 6a to 6f toward the optical axis and protrudes further than the contacts 6a to 6f in the contacting direction of them (in the optical axis direction). The other protruding part 5d is also located perpendicularly away from the contacts 6a to 6f of the camera body toward the optical axis and protrudes further than them in their contacting direction.

Meanwhile the lens-side contact holder 13 is provided with cutout parts 13c and 13d which are formed to extend in the optical axis direction. The cutout part 13c is located perpendicularly away from the lens-side contacts 14a to 14f toward the optical axis and is formed in their contacting direction (the optical axis direction) to be in a position corresponding to the above-stated protruding part 5c when the two mounts 2 and 11 are coupled with or detached from each other. The other cutout part 13d is also located perpendicularly away from the lens-side contacts 14a to 14f toward the optical axis and is formed in the contacting direction to be in a position corresponding to the above-stated protruding part 5d when the two mounts 2 and 11 are completely coupled with each other. In other words, the cutout parts 13c and 13d are formed to ensure that the two mounts 2 and 11 can be coupled with and detached from each other without being hindered by the protruding parts 5c and 5d.

The camera-side power supply contacts 6a and 6f can be prevented from short-circuiting by the provision of the above-stated protruding parts 5c and 5d. Without these protruding parts 5c and 5d, the contacts 6a and 6f might be caused to short-circuit, like in the case of the conventional camera system, when some metal piece like a coin is inadvertently brought near to the camera-side contacts or dropped on the camera body. Whereas, in the case of the embodiment, the contacts 6a and 6f are guarded by the protruding parts 5c and 5d to prevent any metal piece from being inadvertently brought into contact with these contacts 6a and 6f. While the embodiment is provided with the protruding parts 5c and 5d extending in two directions for the higher degree of safety, the short-circuit preventing effect can be attained by omitting one of them. Further, the protruding part 5c extends to cover all the camera-side contacts 6a to 6f for the purpose of preventing them from being mistaken for the power supply contacts 6a and 6f. However, if the protruding parts are required to prevent only the possibility of short-circuit, they may be replaced with only one protruding part that extends to cover only the length of one of the contacts 6a and 6f.

In the case of this embodiment, the short-circuit preventing effect for the power supply contacts 6a and 6f is synergetically attained by the above-stated protruding parts 5c and 5d in combination with the stepped difference in height. In other words, the power supply contacts 6a and 6f have different heights in the contacting direction (the optical axis direction). Therefore, short-circuiting can be prevented even in a case where a long metal rod, plate or the like happens to be pushed against the end face of the protruding part 5c along the whole length thereof.

Further, in the case of this embodiment, the power supply contact 6a which is at ground level side and is most desired to be not brought into contact with other pieces is guarded to enhance safety by the adjacent two protruding parts 5c and 5d extending sideways in two different directions. The protruding part 5d which extends not only in the diametral direction but also around the optical axis should be located only at the end point of the mounting movement of the interchangeable lens 10 (in the direction of arrow X). Therefore, in the case of this embodiment, the above-stated advantageous effect is attained by positioning the contact 6a at the end point of the mounting movement of the interchangeable lens 10.

Further, the protruding part 5c is formed on the optical axis side of the camera-side contacts 6a to 6f, because: In the camera body, there is a larger space on the optical axis side of the alignment of the camera-side contacts 6a to 6f than the other side and, therefore, the optical axis side is more easy of access for a metal piece such as a coin.

Further, in the case of the embodiment, the lens-side contact holder 13 is provided with the cutout parts 13c and 13d which correspond to the protruding parts 5c and 5d of the camera body. Therefore, the flange back of the camera body 1 can be arranged in the same manner as the conventional camera system, so that the provision of the protruding parts presents no problem.

In the embodiment, the slanting face 13b of the lens-side contact holder 13 is arranged to have a greater angle of inclination than the other slanting face 13a for the purpose of preventing spacing distances from increasing between the contacts 14e and 14f and between the contacts 6f and 6e.

Next, referring to FIG. 6, the circuit arrangement of a lens-interchangeable camera-incorporating type VTR which is arranged in accordance with this invention is as follows: In FIG. 6, a camera unit C is shown on the right side and a lens unit L on the left side of a one-dot chain line which is vertically drawn in the middle part to represent a mount part M.

A light flux coming from an object 101 is imaged through a lens optical system 102 on the image sensing plane of an image sensor 103. The image is photo-electric converted by the image sensor 103 and is produced as an image signal. The image signal is converted into a TV signal by a camera signal processing circuit 104. The TV signal is supplied to an automatic white balance adjustment circuit 114 (hereinafter referred to as AWB circuit), an automatic focusing circuit 115 (hereinafter referred to as AF circuit), an automatic exposure control circuit 116 (hereinafter referred to as AE circuit), etc.

These automatic control circuits including the AWB circuit 114, the AF circuit 115 and the AE circuit 116 produce control signals of varied kinds. These control signals are respectively supplied to the applicable controlled systems. The control signal output from the AWB circuit 114 to be used for color balance adjustment in carrying out a camera signal processing action is supplied to the camera signal processing circuit 104. Meanwhile, control signals C1 and C2 output from the AF circuit 115 and the AE circuit 116 are supplied to a microcomputer 119 which is disposed on the side of the camera unit C.

A zoom switch 117 which is provided for setting the focal length of the optical system is arranged to produce a control signal C3. The control signal C3 is also supplied to the camera-side microcomputer 119.

Communication data including the above-stated control signals is sent out from the camera unit C to the lens unit L through a communication line 126 which is formed jointly by the electric contact groups disposed at the mounts as mentioned in the foregoing.

The data communication line 126 is connected to a lens-side microcomputer 120. All the communication data is first received by the lens-side microcomputer 120. The various control signals C1, C2 and C3 which have been supplied to the camera-side microcomputer 119 are thus transmitted via the data communication line 126 (the contacts 6b to 6e and 14b to 14e) to the lens-side microcomputer 120. The data thus transmitted are converted into control variables C1', C2' and C3' suited for the systems to be controlled. These control variables C1', C2' and C3' are then supplied respectively to an AF driver circuit 127, an AE driver circuit 126 and a zoom driver circuit 125. As a result, the optical system 102 is controlled by actuators 128, 129 and 130 accordingly. Further, the optical system 102 is provided with encoders 131, 132 and 133 for the purpose of confirming the operating states of these actuators.

The encoder 131 is provided for detecting a focal point; the encoder 132 for detecting an aperture position; and the encoder 133 for detecting information on a focal length obtained by the zooming operation. Data indicating the results of detection thus obtained is sent to the lens-side microcomputer 120. The data from these encoders is not only used for control over the lens but is also sent, as necessary, to the camera-side microcomputer 119 to be used for AF and AE actions of the camera unit C.

Figure 7:
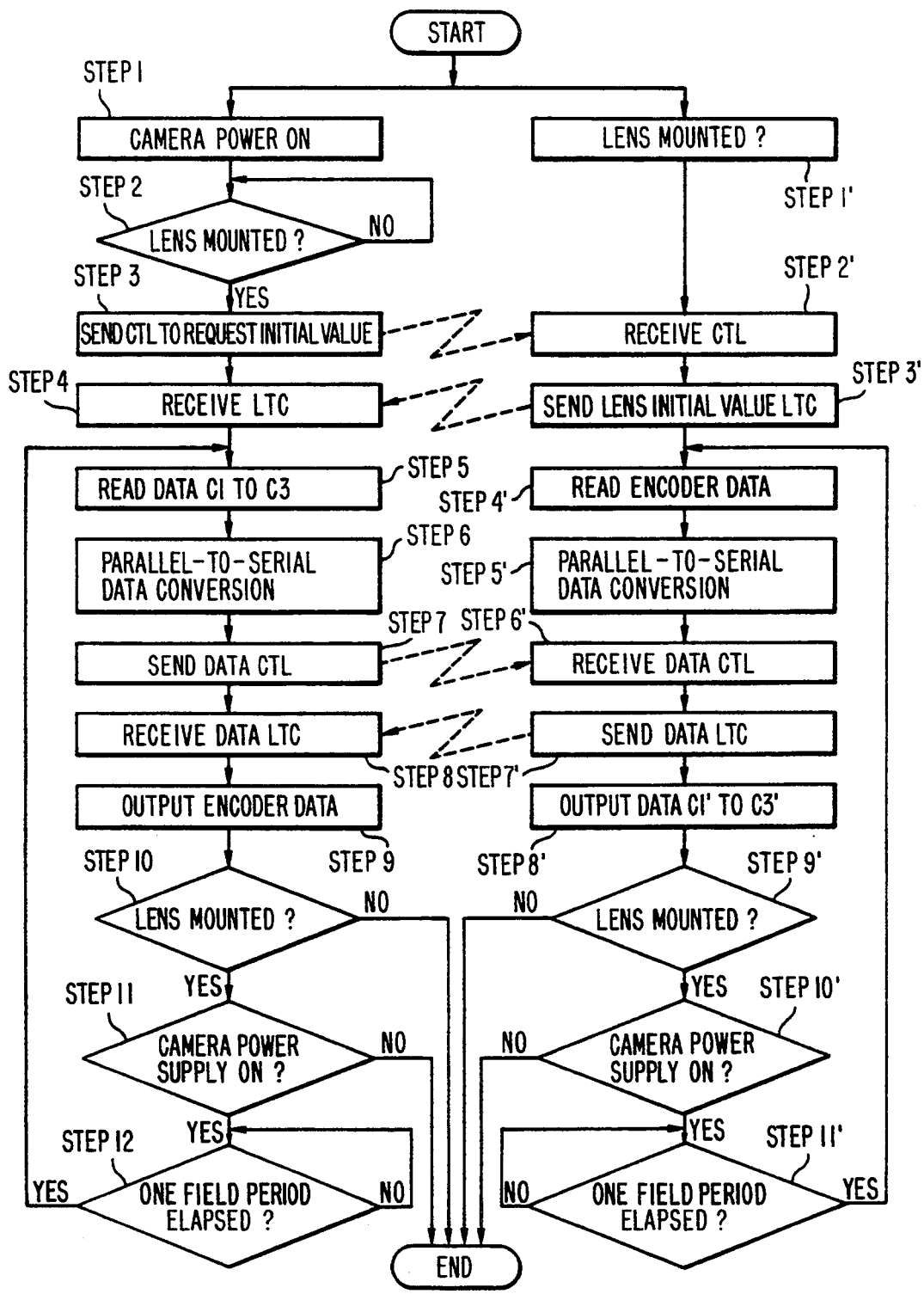
FIG. 7 is a flow chart showing the operation of the circuit arrangement of FIG. 6.

Referring to FIG. 7 which is a flow chart, the operation of the circuit arrangement of FIG. 6 is as follows: Step 1: The power supply of the camera unit C is switched on. Step 2: The camera-side microcomputer 119 makes a check as to whether the lens unit L is mounted on the camera unit C. Step 3: A request for transmission of the initial data about the lens unit is sent out via the data transmission line 126. After that, the flow comes to a step 4. At the step 4: The initial data of varied kinds including the kind of the lens unit in use, etc. is received from the lens unit. Step 5: The camera-side microcomputer 119 reads the above-stated various data C1, C2 and C3. Step 6: These data inputs are parallel-to-serial converted into data CTL. Step 7: The data CTL thus obtained is sent out to the lens unit L.

At step 8: Data LTC which is of varied kinds including information on the results of detection made by the encoders are received from the lens unit. Step 9: Various control actions are performed by selecting the encoder data. After that, the flow comes to a step 10. At the step 10: A check is made for the presence of the lens unit. If the lens unit is found to be mounted on the camera unit, the flow comes to a step 11 to find if the camera power supply is switched on. If so, the flow comes to a step 12. At the step 12: The flow awaits the lapse of one field period. After that the flow comes back to the step for reading the data C1 to C3. This routine comes to an end either if the lens unit is dismounted or if the camera power supply is switched off.

Meanwhile, the operation performed on the side of the lens unit L is as follows: At a step 1': The lens unit L is mounted on the camera unit C. Step 2': The request CTL for the initial data is received from the camera unit. Step 3': The initial data for the lens unit is sent out as data LTC to the camera. At the step 3', the initial data or values are read out from a ROM or the like connected to the lens-side microcomputer 120 and are parallel-to-serial converted into the data LTC, so that the data LTC is sent out to the camera unit.

Step 4': The lens-side microcomputer 120 reads the detection data of the encoders 131, 132 and 133 which detect the state of the lens unit. Step 5': The data is parallel-to-serial converted. Step 6': The data CTL is received from the camera unit. Step 7': The data LTC is sent out to the camera unit. Step 8': The data of varied kinds C1', C2' and C3' which are obtained at the steps 4' and 5' are produced. Steps 9', 10' and 11': If the lens unit still remains mounted on the camera unit and if the camera power supply is still on, the flow awaits the lapse of one field period. After that, again the lens-side microcomputer 120 reads the detection data of the encoders. If the lens unit is dismounted or if the camera power supply is switched off, the flow of this routine comes to an end.

The control data of varied kinds are thus communicated between the camera unit and the lens unit and various parts are controlled accordingly.

For example, the AF control signal C1' is supplied to the driver circuit 127. Then, in accordance with the output of the driver circuit 127, the actuator 128 which is provided for automatic focusing (AF) controls and adjusts the position of the optical system 102 in such a way as to obtain an in-focus state. Further, the AE (automatic exposure) control signal C2' is supplied to the driver circuit 126. Then, in accordance with the output of the driver circuit 126, the AE actuator 129 controls the optical system 102 to adjust its aperture to an optimum aperture position. Further, the zoom control signal C3' is supplied to the driver circuit 125. In response to the output of the driver circuit 125, the zooming actuator 130 controls and adjusts the position of the optical system 102 to obtain a focal length designated by the output of the driver circuit 125.

While the two groups of connection terminals or contacts are arranged, in the specific embodiment described, to be brought into contact with each other by moving then in the direction of the optical axis, the same advantageous effects are attainable by changing the contacting direction from the optical axis direction to a direction perpendicular to the optical axis (the diametral direction).

Figure 8:
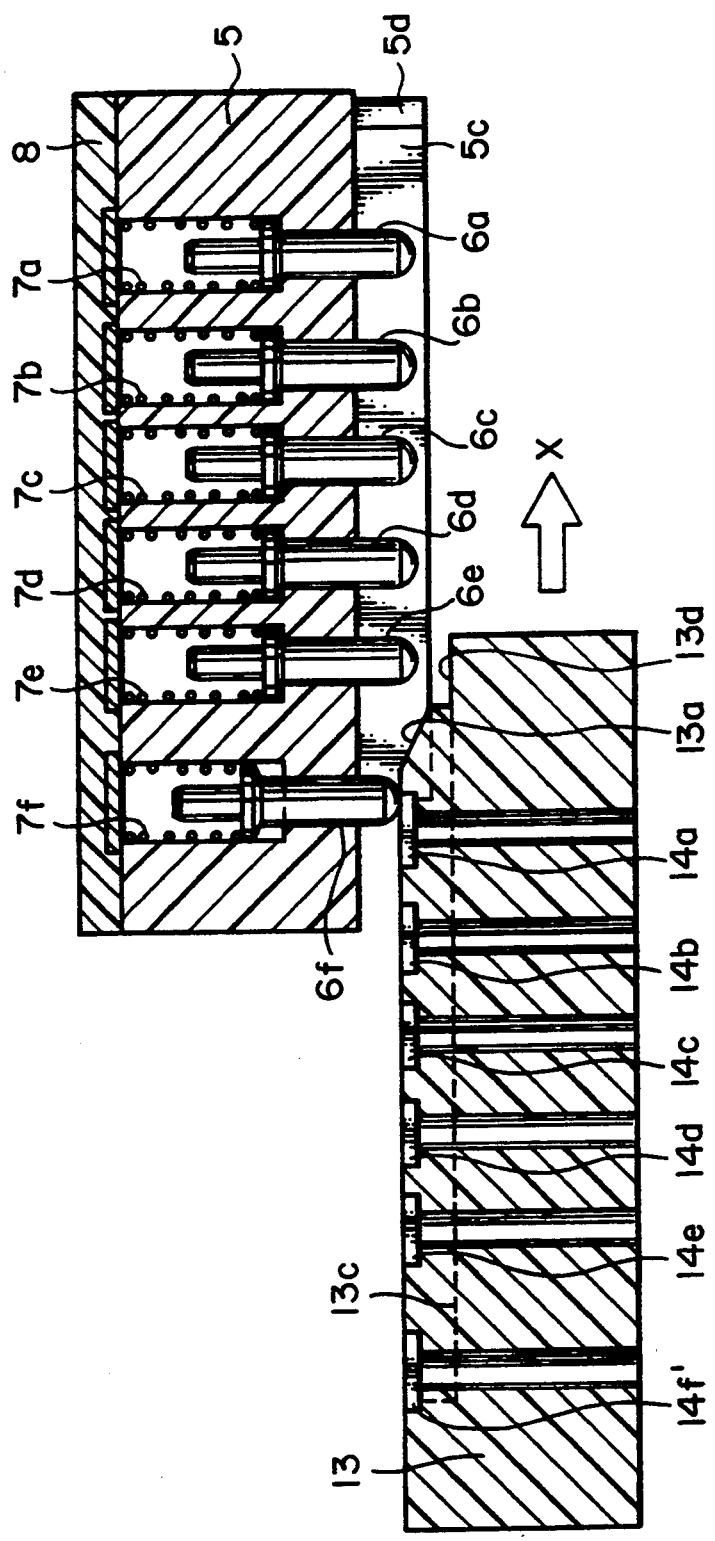
FIG. 8 is an enlarged sectional view showing the essential members of mount parts arranged as a modification example.

In the embodiment described, both the groups of contacts on the camera and lens sides are arranged to have stepped differences in height, the fundamental advantageous effect is also attainable by changing this arrangement to have no stepped difference as shown in FIG. 8.

While the stepped difference in height is provided also for the lens-side group of contacts 14a to 14f in the embodiment, the arrangement to have the stepped difference of the lens-side contacts can be omitted by suitably adjusting and setting the moving strokes of the camera-side contacts in the contacting direction.

Figure 2:
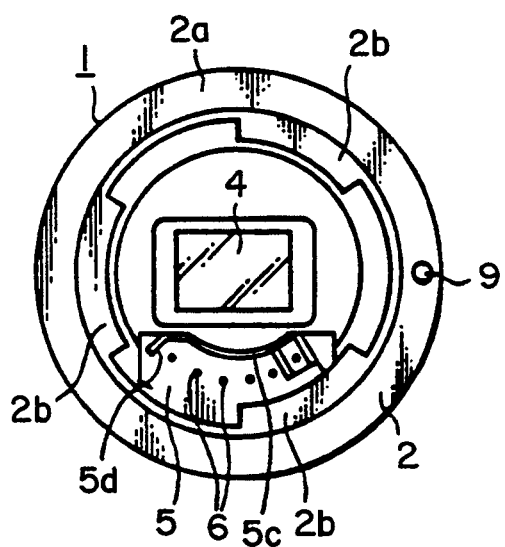
FIG. 2 is a plan view showing the camera body as viewed from its mount part.
Figure 3:
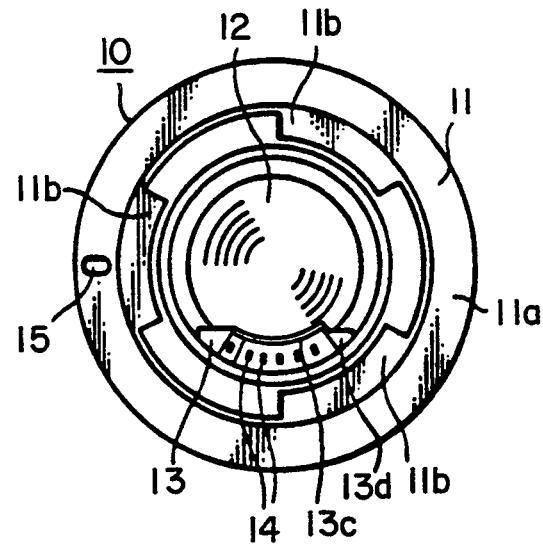
FIG. 3 is a plan view showing the interchangeable lens as viewed from its mount part.
Figure 9:
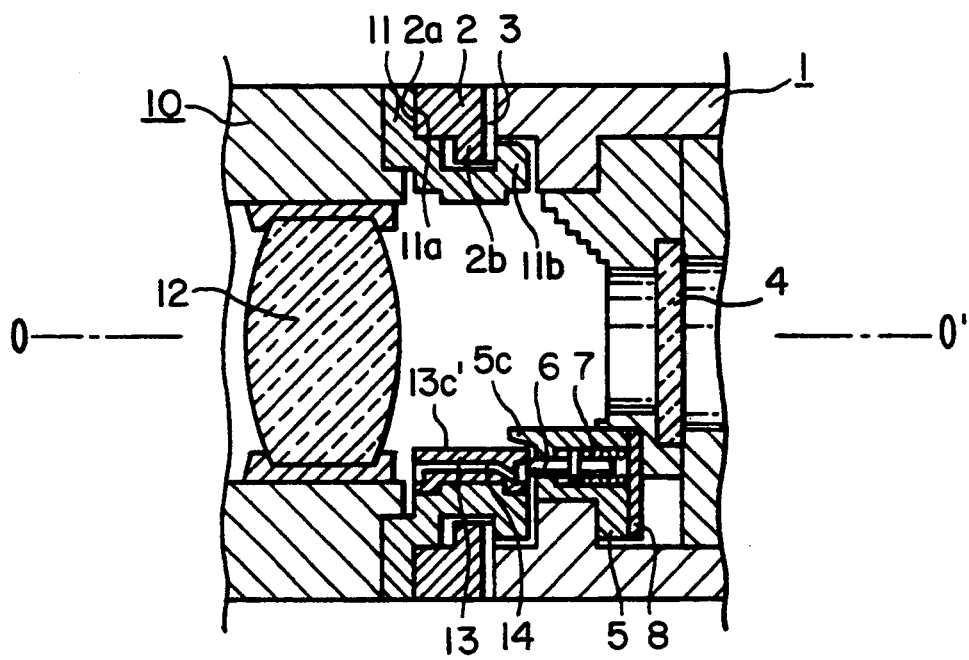
FIG. 9 is a sectional view of the modification example showing a camera body and an interchangeable lens as in a state of having the latter mounted on the former.
Figure 10:
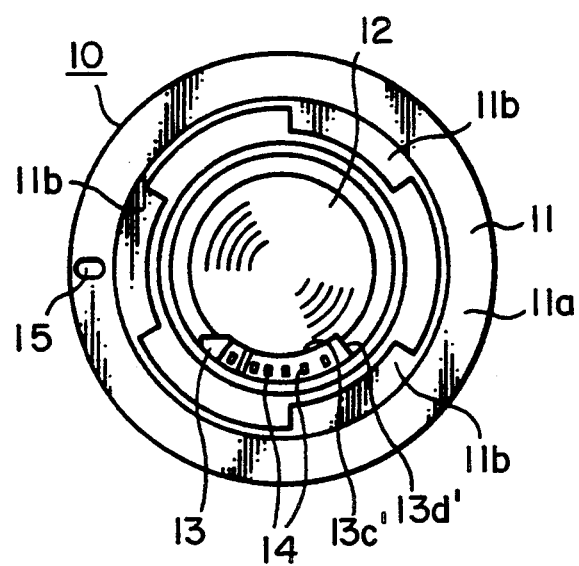
FIG. 10 is a plan view showing the interchangeable lens of the modification example as viewed from its mount part.

In the case of the embodiment described, the depths in the contacting direction of the cutout parts of the lens-side contact holder 13 are arranged to be approximately corresponding to the heights of the protruding parts 5c and 5d as apparent from FIGS. 1 and 2. However, the cutout arrangement of course may be changed to completely cut away the applicable side parts (two sides) of the lens-side contact holder 13 in such a manner as shown in FIGS. 9 and 10. This modification of structural arrangement of course comes also within the spirit and scope of this invention.

The arrangement of the embodiment described gives a safe camera system, a camera body or an optical accessory which never be short-circuited even when a metal piece such as a coin is inadvertently brought near to the electric connection terminals disposed on the side of the camera body including the power supply connection terminals.

What is claimed is:

1. A camera system comprising:
   a camera body having a camera-body mount and a plurality of electric connection terminals which are aligned approximately around an optical axis, said camera body comprising:
   a protruding part which is formed proximate to said electric connection terminals of said camera body, protrudes further than said electric connection terminals of said camera body in their contacting direction, and is disposed closer to the optical axis than said plurality of electric connection terminals of said camera body; and
   an optical accessory having an optical-accessory mount which is arranged to be detachably coupled with said camera-body mount by rotating around the optical axis and having a plurality of electric connection terminals which include power supply receiving terminals and which are aligned approximately around said optical axis in a position to come into contact with said electric connection terminals of said camera body when said optical-accessory mount is rotatably coupled with said camera-body mount,
   wherein said plurality of electric connection terminals of said camera body are supported by a first contact holder and said plurality of electric connection terminals of said optical accessory are supported by a second contact holder, and said protruding part of said camera body is formed integrally with said first contact holder.

2. A camera system according to claim 1, wherein said plurality of electric connection terminals of said camera body are movable relative to said first contact holder in a contacting direction of said plurality of electric connection terminals of said camera body and have contact portions protruding on said first contact holder by being elastically urged to move in the contacting direction, and wherein said plurality of electric connection terminals of said optical accessory are fixedly supported by said second contact holder and have contact portions arranged to be substantially flush with the surface of said second contact holder.

3. A camera system according to claim 1, wherein at least one of said plurality of electric connection terminals of said camera body has a height different from the height of the others of said plurality of electric connection terminals in the contacting direction, and wherein at least one of said plurality of electric connection terminals of said optical accessory has a height different from the height of others of said plurality of electric connection terminals in the contacting direction.

4. A camera system according to claim 1, wherein said plurality of electric connection terminals of said camera body include two power supply terminals and a plurality of communication terminals aligned substantially in a row, and wherein said power supply terminals are separated from each other by setting the same respectively at opposite ends of said electric connection terminals of said camera body.

5. A camera system comprising:
   a camera body having a camera-body mount and a plurality of electric connection terminals which are aligned approximately around an optical axis, said camera body including
   a protruding part which is formed proximate to said electric connection terminals of said camera body and protrudes farther than said electric connection terminals of said camera body in their contacting direction, and
   an optical accessory having an optical-accessory mount which is arranged to be detachably coupled with said camera-body mount by rotating around the optical axis and having a plurality of electric connection terminals which include power supply receiving terminals and which are aligned approximately around said optical axis in a position to come into contact with said electric connection terminals of said camera body when said optical-accessory mount is rotatably coupled with said camera-body mount, wherein said protruding part of said camera body is disposed closer to the optical axis than said plurality of electric connection terminals of said camera body.

6. An optical accessory mountable on a camera body, having an accessory mount which can be detachably, rotatably coupled with a camera-body mount of said camera body by rotating around an optical axis relative to said camera-body mount, said camera body having a plurality of electric connection terminals supported by a contact-holder having a protruding part formed integrally with said contact-holder so as to protrude in the contacting direction of said terminals, said optical accessory comprising:
   a plurality of electric connection terminals including power supply receiving terminals, said electric connection terminals of said optical accessory being arranged to come into contact with said electric connection terminals of said camera body when said two mounts are coupled with each other, and said electric connection terminals of said optical accessory being aligned approximately around an optical axis, wherein a cutout part is formed to extend approximately along said electric connection terminals of said optical accessory, said cutout part being formed in a position which corresponds to said protruding part of said camera body when said two mounts are coupled with each other;
   a contact holder for supporting said electric connection terminals of said optical accessory, wherein said cutout part is formed by cutting said contact holder, wherein said protruding part of said camera body is arranged to move relative to said optical accessory when said two mounts are rotatably coupled.

7. An optical accessory according to claim 6, further comprising a contact holder for supporting said electric connection terminals of said optical accessory, and wherein said plurality of electric connection terminals of said optical accessory are supported by said contact holder, and said contact holder has a surface formed in such a manner that it does not contact said protruding part during the coupling of said two mounts.

8. An optical accessory according to claim 6, wherein said plurality of electric connection terminals of said optical accessory are fixedly supported by said contact holder and have contact portions arranged to be substantially flush with the surface of said contact holder.

9. An optical accessory according to claim 6, wherein said cutout part is formed by cutting away a part of said contact holder located closer to the optical axis than said electric connection terminals of said optical accessory.

10. An optical accessory according to claim 6, wherein said plurality of electric connection terminals of said optical accessory include two power supply receiving terminals and a plurality of communication terminals aligned substantially in a row, and wherein said power supply receiving terminals are separated from each other by disposing the same respectively at opposite ends of the alignment of said plurality of electric connection terminals.

11. An optical accessory according to claim 6, further comprising:
a first optical system for performing a focusing operation;
a second optical system for performing a zooming operation;
a first actuator arranged to move said first optical system in the direction of the optical axis;
a second actuator arranged to move said second optical system in the direction of the optical axis;
first detection means for detecting a position of said first optical system;
second detection means for detecting a position of said second optical system; and
a control circuit arranged to supply signals indicative of the positions detected by said first and second detection means to said camera body through electric connection terminals arranged to communicate with said optical accessory.

12. An optical accessory mountable on a camera body, having an accessory mount which can be detachably, rotatably coupled with a camera-body mount of said camera body by rotating around an optical axis relative to said camera-body mount, said camera body having a plurality of electric connection terminals and a protruding part formed proximate to said electric connection terminals so as to protrude in the contacting direction of said terminals, comprising:
a plurality of electric connection terminals including power supply receiving terminals, said electric connection terminals of said optical accessory being arranged to come into contact with said electric connection terminals of said camera body when said two mounts are coupled with each other; and
said protruding part of said camera body being arranged to move relative to said optical accessory when said two mounts are rotatably coupled;
wherein said plurality of electric connection terminals of said optical accessory are aligned approximately around an optical axis, and wherein a cutout part is formed to extend approximately along said electric connection terminals of said accessory, said cutout part formed in a position which corresponds to said protruding part of said camera body when said two mounts are coupled to each other and wherein said cutout part is disposed closer to the optical axis than said electric connection terminals of said optical accessory.

13. An optical accessory mountable on a camera body, said accessory having an accessory mount which can be detachably coupled with a camera-body mount of the camera body, the camera body having a plurality of electric connection terminals supported by a contact-holder, and having a protruding part formed integrally with said contact-holder, wherein said protruding part protrudes in the contacting direction of the electric connection terminals, said optical accessory comprising:
a plurality of accessory electric connection terminals including power supply receiving terminals, at least one of said accessory connection terminals having a height different from the height of the other terminals in the contacting direction of said accessory electric connection terminals, said plurality of electric connection terminals of said optical accessory being arranged to come into contact with said plurality of electric connection terminals of the camera body when said accessory mount is coupled with the camera-body mount, wherein said plurality of electric connection terminals of said optical accessory are aligned approximately around an optical axis; and
a contact holder for supporting said plurality of electric connection terminals of said optical accessory, said contact holder being arranged to be out of a moving zone of said protruding part of said camera body during the coupling of said two mounts,
wherein a cutout part is formed to extend along said electric connection terminals of said optical accessory, said cutout part being formed so as to prevent said protruding part from contacting said contact holder even during the coupling of said two mounts.

14. An optical accessory according to claim 13, wherein said plurality of electric connection terminals of said optical accessory are fixedly supported by a contact holder and have contact portions arranged to be substantially flush with the surface of said contact holder, and wherein a surface of said contact holder is stepped.

15. An optical accessory according to claim 13, wherein said cutout part is formed by cutting said contact holder.

16. An optical accessory according to claim 13, wherein said plurality of electric connection terminals of said optical accessory include two power supply receiving terminals and a plurality of communication terminals aligned substantially in a row, and wherein said power supply receiving terminals are separated from each other by disposing them at opposite ends of the alignment of said plurality of accessory electric connection terminals.

17. An optical accessory according to claim 13, further comprising:

a first optical system for performing a focusing operator;
a second optical system for performing a zooming operation;
a first actuator arranged to move said first optical system in the direction of the optical axis;
a second actuator arranged to move said second optical system in the direction of the optical axis;
first detection means for detecting a position of said first optical system;
second detection means for detecting a position of said second optical system; and
a control circuit arranged to supply signals indicative of the positions detected by said first and second detection means to said camera body through electric connection terminals arranged to communicate with said optical accessory.

18. An optical accessory mountable on a camera body, said accessory having an accessory mount which can be detachably coupled with a camera-body mount of the camera body, the camera body being provided with a protruding part arranged proximate to a plurality of electric connection terminals of the camera body, wherein the protruding part protrudes in the contacting direction of the camera body electric connection terminals, said optical accessory comprising:.
a plurality of accessory electric connection terminals including power supply receiving terminals, at least one of said accessory connection terminals having a height different from the height of the other terminals in the contacting direction of said accessory electric connection terminals, said plurality of electric connection terminals of said optical accessory being arranged to come into contact with said plurality of electric connection terminals of the camera body when said accessory mount is coupled with the camera-body mount; and
a contact holder for carrying said plurality of electric connection terminals of said optical accessory, said contact holder being arranged to be out of a moving zone of said protruding part of said camera body during the coupling of said two mounts;
wherein said plurality of electric connection terminals of said optical accessory are aligned approximately around an optical axis, and wherein a cutout part is formed to extend along said electric connection terminals of said accessory, and said cutout part is formed so as to prevent said protruding part from contacting said contact holder even during the coupling of said two mounts and wherein said cutout part is disposed closer to the optical axis than said electric connection terminals of said optical accessory.

19. A camera system comprising:
a camera body having a camera-body mount and a plurality of electric connection terminals aligned substantially around an optical axis, said camera body including:
a protruding part formed proximate to said electric connection terminals of said camera body and protruding further than said electric connection terminals of said camera body in a direction of the optical axis, said protruding part being disposed closer to the optical axis than said plurality of electric connection terminals of said camera body, and
an optical accessory having an optical-accessory mount arranged to be detachably coupled with said camera-body mount by rotating around the optical axis and having a plurality of electric connection terminals aligned approximately around said optical axis in a position to come into contact with said electric connection terminals of said camera body when said optical-accessory mount is rotatably coupled with said camera-body mount.

20. A camera system according to claim 19, wherein said plurality of electric connection terminals of said camera body are supported by a first contact holder and said plurality of electric connection terminals of said optical accessory are supported by a second contact holder.

21. A camera system according to claim 20, wherein said plurality of electric connection terminals of said camera body are movable relative to said first contact holder in a contacting direction of said plurality of electric connection terminals of said camera body and have contact portions protruding on said first contact holder by being elastically urged to move in the contacting direction, and wherein said plurality of electric connection terminals of said optical accessory are fixedly supported by said second contact holder and have contact portions arranged to be substantially flush with the surface of said second contact holder.

22. A camera system according to claim 20, wherein said protruding part of said camera body is formed integrally with said first contact holder.

23. An optical accessory mountable on a camera body, having an accessory mount which can be detachably, rotatably coupled with a camera-body mount of said camera body by rotating around an optical axis relative to said camera-body mount, said camera body having a plurality of electric connection terminals and a protruding part formed proximate to said electric connection terminals so as to protrude in a direction of the optical axis, said protruding part of said camera body is disposed closer to the optical axis than said plurality of electric connection terminals of said camera body, comprising:
a plurality of electric connection terminals being arranged to come into contact with said electric connection terminals of said camera body when said two mounts are coupled with each other; and
said protruding part of said camera body being arranged to move relative to said optical accessory when said two mounts are rotatably coupled.

24. An optical accessory according to claim 23, further comprising a contact holder for supporting said electric connection terminals of said optical accessory, and wherein said plurality of electric connection terminals of said optical accessory are supported by said contact holder, and said contact holder has a surface formed in such a manner that it does not contact said protruding part during the coupling of said two mounts.

25. An optical accessory according to claim 23, wherein said plurality of electric connection terminals of said optical accessory are fixedly supported by said contact holder and have contact portions arranged to be substantially flush with the surface of said contact holder.

26. An optical accessory according to claim 23, wherein said plurality of electric connection terminals of said optical accessory are aligned approximately around an optical axis, and wherein a cutout part is formed to extend approximately along said electric connection terminals of said accessory, said cutout part formed in a position which corresponds to said protruding part of said camera body when said two mounts are coupled to each other.

27. An optical accessory according to claim 26, further comprising a contact holder for supporting said electric connection terminals of said optical accessory, and wherein said cutout part is formed by cutting said contact holder.

28. An optical accessory according to claim 26, wherein said cutout part is disposed closer to the optical axis than said electric connection terminals of said optical accessory.

29. An optical accessory according to claim 27, wherein said cutout part is formed by cutting away a part of said contact holder located closer to the optical axis than said electric connection terminals of said optical accessory.

30. An optical accessory according to claim 23, wherein said plurality of electric connection terminals of said optical accessory include two power supply receiving terminals and a plurality of communication terminals aligned substantially in a row, and wherein said power supply receiving terminals are separated from each other by disposing the same respectively at opposite ends of the alignment of said plurality of electric connection terminals.

31. An optical accessory according to claim 23, further comprising:
- a first optical system for performing a focusing operation;
- a second optical system for performing a zooming operation;
- a first actuator arranged to move said first optical system in the direction of the optical axis;
- a second actuator arranged to move said second optical system in the direction of the optical axis;
- first detection means for detecting a position of said first optical system;
- second detection means for detecting a position of said second optical system; and
- a control circuit arranged to supply signals indicative of the positions detected by said first and second detection means to said camera body through electric connection terminals arranged to communicate with said optical accessory.

* * * * *

UNITED STATES PATENT AND TRADEMARK OFFICE
CERTIFICATE OF CORRECTION

PATENT NO. : 5,359,379
DATED : October 25, 1994
INVENTOR(S) : KOHNO, ET AL.

It is certified that error appears in the above-indentified patent and that said Letters Patent is hereby corrected as shown below:

Column 1

Line 64, "cost" should read --cost.--
    Line 65, "increase." should be deleted.

Column 7

Line 12, "the-optical" should read --the optical--.
    Line 40, "obtained-by" should read --obtained by--.

Column 9

Line 17, "which" should read --which can--.

Column 10

Line 18, "including" should read --including:--.
    Line 21, "farther" should read --further--.
    Line 63, "other" should read --other; and --.

UNITED STATES PATENT AND TRADEMARK OFFICE
CERTIFICATE OF CORRECTION

PATENT NO. : 5,359,379
DATED : October 25, 1994
INVENTOR(S) : KOHNO, ET AL.

It is certified that error appears in the above-indentified patent and that said Letters Patent is hereby corrected as shown below:

Column 13

Line 26, "comprising:." should read --comprising:--.

Signed and Sealed this

Twenty-eight Day of March, 1995

Attest:

BRUCE LEHMAN

*Attesting Officer*    *Commissioner of Patents and Trademarks*